J. W. PARTINGTON.
WIRE CABLE.
APPLICATION FILED SEPT. 24, 1918.
1,334,257.
Patented Mar. 16, 1920.
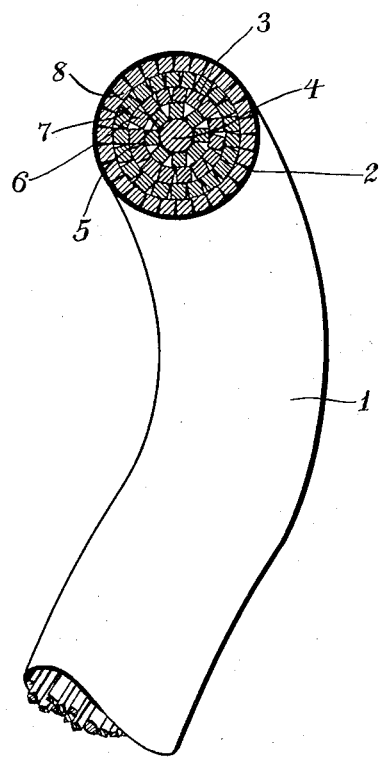
WITNESSES
Arthur Prisch
A. L. Kitchin
INVENTOR
J.W. PARTINGTON
BY
ATTORNEYS

UNITED STATES PATENT OFFICE.

JAMES W. PARTINGTON, OF PASSAIC, NEW JERSEY.

WIRE CABLE.

1,334,257. Specification of Letters Patent. Patented Mar. 16, 1920.

Application filed September 24, 1918. Serial No. 255,412.

*To all whom it may concern:*

Be it known that I, JAMES W. PARTINGTON, a citizen of the United States, and a resident of Passaic, in the county of Passaic and State of New Jersey, have invented a new and Improved Wire Cable, of which the following is a full, clear, and exact description.

This invention relates to cables and particularly to power carrying cables, and has for an object the provision of an improved construction wherein a maximum cross sectional area is provided in a minimum space.

Another object of the invention is to provide a cable with a central wire and square wires wound thereon, the respective wires being wound in the opposite direction.

A still further object of the invention is to provide a cable which is provided with wires square in cross section forming the outer layer and an insulating coating thereon engaging one of the flat sides of the respective wires.

With these and other objects in view the invention consists of a cable comprising a round central core, a plurality of superimposed layers of wires arranged on the central core, all of said wires square in cross-section, and the inner corners of adjacent wires in each layer positioned snugly together, with the spaces between the outer corners of adjacent wires gradually decreasing in the successive outer layers, and a covering of insulation contacting with the outer surface of the wires of the outer layer.

The accompanying drawing shows a short section of a cable, part being shown in cross section illustrating the arrangement of the strands of the cable.

Referring to the accompanying drawing by numerals, 1 indicates the cable as a whole, said cable being provided with an insulating covering 2 of rubber or other desired material and a body 3 consisting of a number of wire structures wound together. The cable structure 3 is preferably provided with a round central wire 4 which may be larger than the remaining wires without departing from the spirit of the invention. The wire 4 is of course solid throughout, and the layer 5 of wires square in cross section are wound thereon in any desired manner. The wires 5, 6, 7 and 8 are all square in cross section, and by reason of this structure they will lie close together, especially in the outer layers, so that the extreme outer layer, namely wires 8, are almost a solid structure, thus permitting the use of a maximum amount of material and presenting a flat surface to which the rubber insulation 2 may adhere. The rubber may also pass downwardly or rather inwardly between the respective wires 8, but by reason of the large flat surface of the outer face of each of the wires the rubber adheres firmly for the full length of the various wires and over the entire cable.

What I claim is:

A cable, comprising a round central core, a plurality of superimposed layers of wires arranged on the central core, all of said wires square in cross-section, and the inner corners of adjacent wires in each layer positioned snugly together, with the spaces between the outer corners of adjacent wires gradually decreasing in the successive outer layers, and a covering of insulation contacting with the outer surface of the wires of the outer layer.

JAMES W. PARTINGTON.